May 11, 1965

W. NYC 3,182,400

DEVICE AND METHOD FOR MEASURING THE SURFACE
VELOCITY OF MOVING WATER

Filed Oct. 31, 1961

INVENTOR.
WLADIMIR Nyc

May 11, 1965     W. NYC     3,182,400
DEVICE AND METHOD FOR MEASURING THE SURFACE
VELOCITY OF MOVING WATER
Filed Oct. 31, 1961     3 Sheets-Sheet 3

INVENTOR.
WLADIMIR Nyc

United States Patent Office 3,182,400
Patented May 11, 1965

3,182,400
DEVICE AND METHOD FOR MEASURING THE SURFACE VELOCITY OF MOVING WATER
Wladimir Nyc, 3125 U St., Sacramento 17, Calif.
Filed Oct. 31, 1961, Ser. No. 149,001
3 Claims. (Cl. 33—46)

The invention relates to devices for measuring the surface velocity of water flowing in rivers, streams and channels.

Heretofore, the measurement of water flows, while extremely important for hydrologic purposes, has required the use of complex and costly instruments and the services of highly trained personnel. Owing to budgetary limitations, such equipment and personnel in the numbers required for marshalling the desired water flow data have been lacking.

It is therefore an object of the invention to provide a device and method for measuring the surface velocity of moving water which is economical and which, having once been installed, can be operated by a relatively unskilled person.

It is another object of the invention to provide a device and method which is capable of rapid operation yet which is highly efficient and accurate.

It is yet another object of the invention to provide a device and method which is capable of measuring the surface velocity of flowing water under substantially all extremes of light and weather.

It is a further object of the invention to provide a device for and method of measuring surface water speed which is capable of yielding a large volume of data, as desired.

It is an additional object of the invention to provide a generally improved device for and method of measuring the surface velocity of a watercourse.

Other objects, together with the foregoing, are attained in the embodiment described in the following description and shown in the accompanying drawings in which:

FIGURE 5 illustrates the appearance of a developed print of the subject matter photographed at the beginning and end of the determined time interval.

Figure 1:
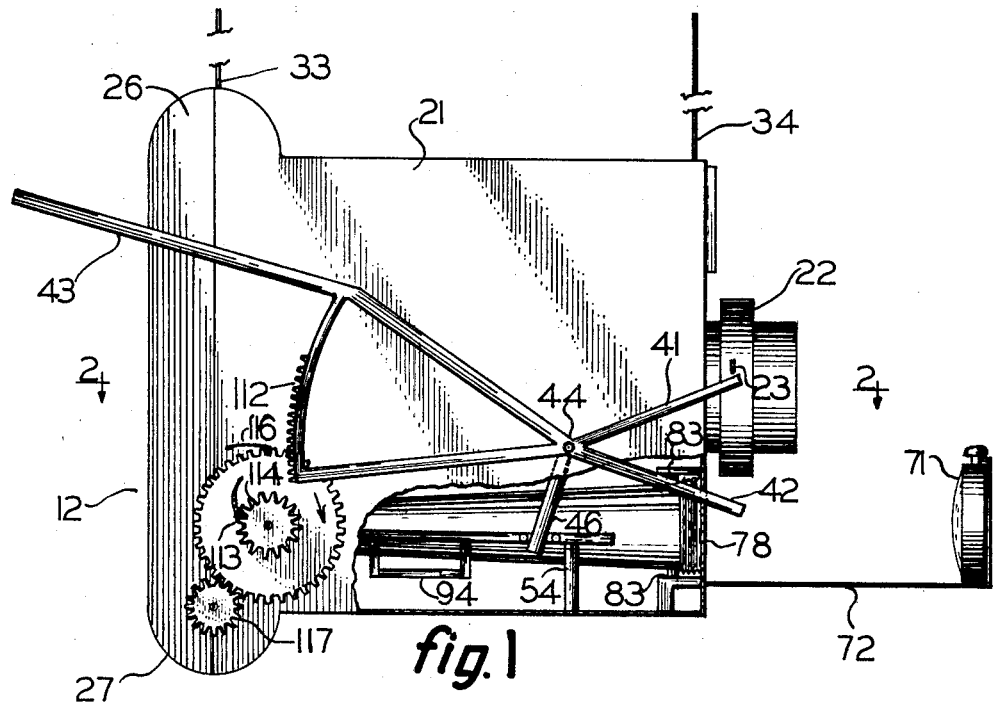
FIGURE 1 is a right side elevational view of the camera portion of the device, with portions being broken away to reveal certain internal structure.

While the device of the invention is susceptible of numerous physical embodiments, depending upon the environment and requirements of use, the herein shown and described embodiment has been subjected to exhaustive tests and has performed in an eminently satisfactory manner.

The device of the invention, generally designated by reference numeral 11, is installed permanently and comprises a camera 12 customarily mounted on a standard 13 located on one bank 14 of a watercourse 15, the opposite bank being indicated by the numeral 16. The device is located next to a conventional recorder 17 or surface water height gauge which provides a constant record of the height of the water surface 20. The value of the height "H" (see FIGURE 4) of the camera above the surface 20 of the watercourse can be calculated by reference to the record provided by the height gauge 17. Since the profile or transverse section of the stream (FIGURE 4) is determined at the time the recorder is installed, it can be seen that for any given stream level, a determination of the surface velocity will enable a hydrologist to ascertain the volume of flow, a value of extreme importance for many purposes.

Figure 2:
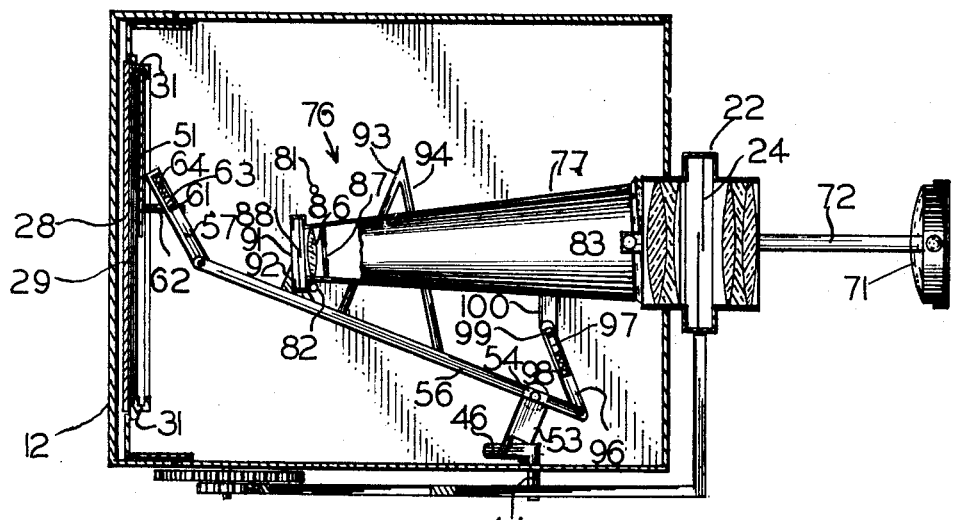
FIGURE 2 is a section, the plane of the section being indicated by the lines 2—2 in FIGURE 1.
Figure 3:
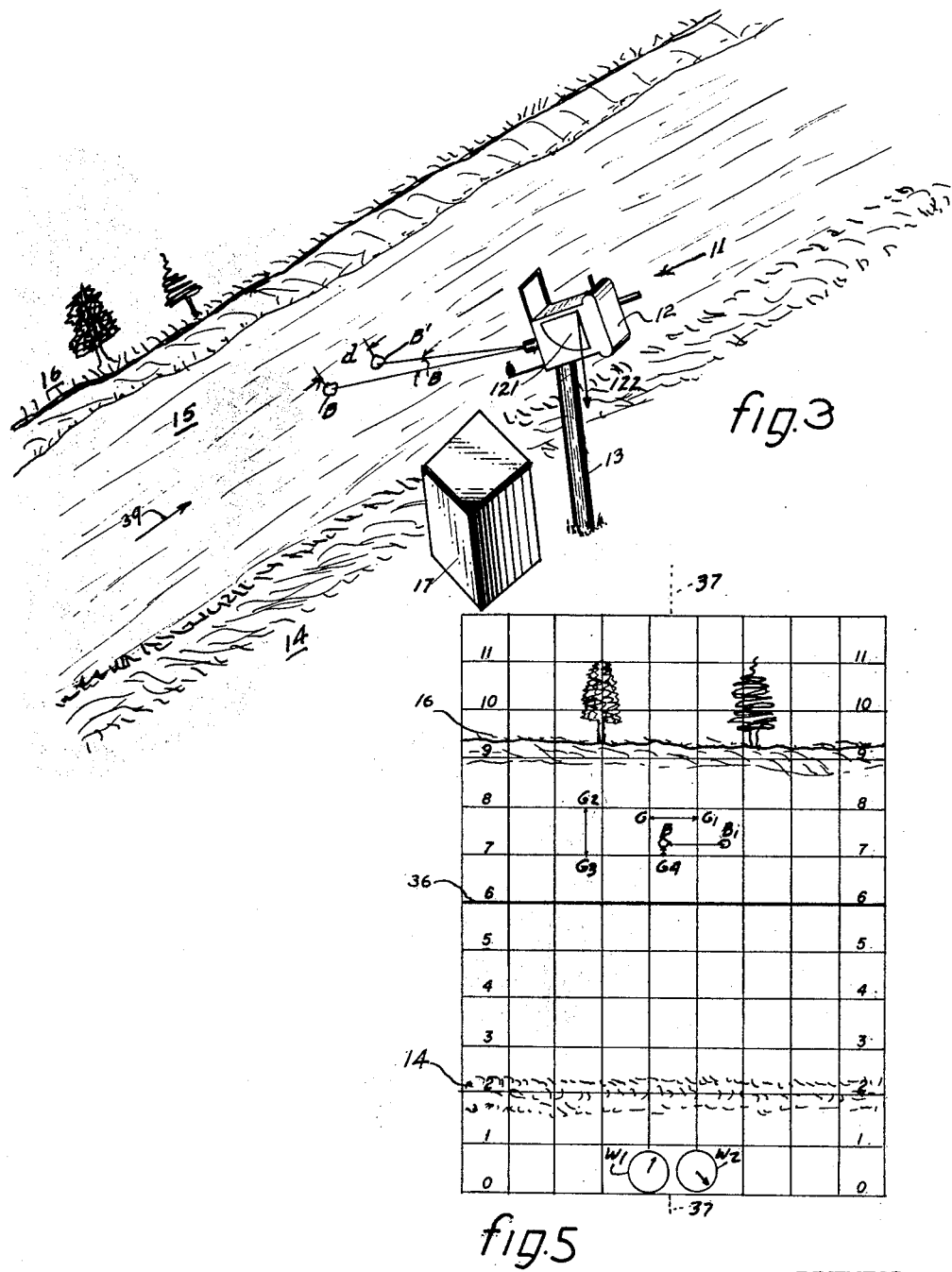
FIGURE 3 is a perspective, from the left rear, showing the device installed in a typical environment, on one bank of a water-course, and showing in full line and in outline the respective positions of a floating block or piece of debris at the beginning and end of a recorded time interval.

With particular reference to FIGURES 1–3 it can be seen that the camera device 12 comprises a substantially light-proof, box-like housing 21, or camera housing. Mounted on the front end of the camera housing is a substantially conventional lens system 22, termed a primary lens, and a shutter lever 23 adapted to operate a shutter 24 only on upward movement of the lever. Downward movement of the lever 23 does not actuate the shutter 24.

Located at the rear end of the camera is a substantially conventional roll-type of film construction including an upper film chamber 26 and a lower film chamber 27, the film 28 moving from top to bottom as it is advanced.

The plane of the film 28, as can be seen most clearly in FIGURE 2, is at right angles to the optical axis of the primary lens system 22, in customary fashion. Also disposed at right angles to the optical axis is a grid plate 29 held vertically in close juxtaposition to and forwardly of the film by a suitable pair of spaced vertical channels 31. The grid plate is a transparent sheet, such as glass, having inscribed thereon a square gridwork of numerically identified fine black lines which are superimposed on the film as the pictures are taken, as can be seen most clearly in FIGURE 5. The spacing of the grid lines is different on each of the plurality of grid plates supplied with the device. The particular grid to be used will depend upon the downward angle of or angle of depression of the primary optical axis (see FIGURES 3 and 4). In the usual installation, once the camera is tilted to the desired angular attitude it remains fixed. Accordingly, the appropriate grid plate once having been put in its position is not replaced.

The desired degree of tilt is determined by looking through a back finder 33 and a front finder 34 mounted on the camera and having suitable apertures therein keyed to or gauged to the field of vision of the primary lens system. In the usual case, the camera is tilted downwardly an amount such that both the far bank and the near bank of the stream will appear on the film (see FIGURE 5).

For convenience, the grids are provided in increments of, for example, five degrees and, in the usual case, the camera is tilted downwardly to some multiple of five degrees while still locating the stream substantially in the middle portion of the film. A thickened horizontal grid line 36 (see FIGURE 5) is provided approximately centrally between the top and the bottom of the grid and this line 36 corresponds to or indicates the optical axis of the primary lens system. For convenience, the horizontal center line is termed the optical axis line. A vertical center line 37 (see FIGURE 5) does not ordinarily appear on the grid but will be referred to in the following description.

Mechanism is provided within the camera for exposing only one-half the film sheet 28 at a time, that is to say, with the installation shown in FIGURE 3, wherein the water is moving from left to right in front of the camera, in the direction indicated by the arrow 39, a first picture is taken in which the left hand half of the film is exposed, followed shortly thereafter by exposure of the right half of the film. The composite exposure, one on each side of the vertical center line 37, provides a record of the distance moved by a selected piece of floating debris B as it moves from its first position B to a second position B'. Where the stream carries no floating debris, a block of wood, suitably painted, if necessary, to provide a color contrast with the water surface, can be tossed in the water, upstream somewhat, and photographed as it floats across the camera's field of view. The finders 33 and 34 provide this information and enable the operator to know when to acuate the shutter for each of the two exposures.

Tripping of the main shutter lever 23 if effected successively by upward movement of a first tripping lever 41 and a second tripping lever 42 (see FIGURE 1). The levers 41 and 42 comprise forward extensions of a tripping arm 43, or handle, mounted on a horizontal pin 44 pivotally mounted on the camera housing. The pin 44 extends interiorly into the camera and is down-turned to form a rockable member 46.

As appears most clearly in FIGURES 1 and 2, downward movement of the tripping arm 43 effects an upward movement of the first lever 41 and the second lever 42, the movement being made by the operator who is standing in back of the camera and looking through the finders 33 and 34. The arm 43 is moved so that the first lever 41 trips the shutter when the block or piece of floating debris B appears in the left hand side of the field of vision and the second lever 42 trips the shutter when the block B is in the right hand side, as in position B' (see FIGURES 3 and 5).

Preferably, a horizontally slidable blinder plate 51, or obscuration plate, covers, successively the two halves of the film, one half being on one side of the vertical center-line 37 and the other half-being on the other side thereof. By exposing the two halves of the film successively, rather than by a double exposure of the entire film, it has been found that a sharper definition of the object B results, both in its first position B and in its second position B'.

Horizontal, timed, or coordinated, movement of the blinder plate 51 from one side to the other is effected by the forward swinging movement of the rocker member 46 as the shutter tripping arm 43 is depressed.

In interfering engagement with the rocker member 46 is a fork 53 pivotally mounted, for horizontal movement, on a pin 54. Secured to the fork 53 and pivotable therewith is an elongated lever 56. Pivotally mounted on the rear end of the lever 56 is an after link 57 pivotally attached to the blinder plate 51. More specifically, a pin 61 upstanding from a forward projection 62 on the blinder plate 51 is translatable within a slot 63 formed in the after link 57, the slot 63 also being provided with a compression spring 64 whose purpose will subsequently be described.

As appears most clearly in FIGURE 2, forward movement of the rocker 46 urges the fork 53 and the lever 56 in a counter-clockwise direction, about the axis of the vertical pin 54. This motion is reflected in a downward (see FIGURE 2) movement of the after link 57 and the blinder plate 51. The dimensions and proportions of the various members are such that the blinder plate does not begin to move to its second station until after the first tripping lever 41 has tripped the shutter 24. Completion of the movement of the blinder plate 51 is effected, however, prior to the second exposure, caused by upward motion of the second tripping lever 42 across the shutter lever 23.

In addition to the split exposure of the floating block in the stream, a split exposure is also made of the time of the two successive exposures. The time record is achieved by taking two pictures of a time-piece 71, preferably having a sweep hand to indicate small time intervals, and which could be a stop-watch. The time-piece or clock, is mounted on the end of a forward projection 72 and is located well below the axis of the primary lens 22 so that the watch does not have its picture taken by the primary lens.

The clock 71 is, however, recorded on each half of the film owing to the provision of a secondary lens system, generally designated by the numeral 76, and which includes a hollow cone 77 having its larger base 78 facing toward the clock. The cone 77 is swingable, within the limits defined by an upper pin 81 and a lower pin 82 (see FIGURE 2), about a vertical pivot pin 83.

Adjacent the rear end of the cone 77 is a secondary lens 86, an aperture 87, and a shutter 88. Below the shutter 88 is a downwardly projecting shutter trip or shutter lever which is not shown but which is, to all intents, substantially identical with the shutter lever 23 of the primary lens system. The secondary shutter lever, as stated above, projects downwardly and extends into interfering relation first with the leading edge 91, or face, of a first shutter trip 92 and, secondly, with the leading edge 93 of a second shutter trip 94, both of the trips being mounted on the elongated swingable link 56.

Movement of the cone 77 between the opposite extremes defined by the limit stop pins 81 and 82 is effected by a forward link 96 pivotally mounted on the forward end of the link 56. The forward link is provided with a slot 97 and in a manner similar to that of the after link 57, a compression spring 98 spaced somewhat from a pin 99 secured to a projection 100 on the cone 77.

The space between the pin 99 and the spring 98 (see FIGURE 2) permits of a certain amount of lost motion or movement upwardly of the forward link 97 before the cone 77 is moved. During this lost motion interval, however, the long lever 56 is urged in a counter-clockwise direction by downward movement of the tripping arm 43 acting through the rocker 46 and the fork 53, as previously explained. As the long lever 56 swings, the leading face 91 of the first trip lever 92 sweeps across the secondary shutter lever (not shown but projecting downwardly below the secondary shutter 88) and trips the secondary shutter. Thus a picture of the watch is taken as the handle 43 is depressed. Substantially simultaneously, as described above, the main shutter is also tripped.

Consequently, as appears in FIGURE 5, the watch appears on the lower portion of the film and indicates the time at which the first exposure of the floating object B was made.

It is also to be noted that the space between the pin 61 and the spring 64 in the after link 57 permits lost motion, or movement, of the link before the blinder plate begins to be urged away from its first station.

As counter-clockwise movement of the lever 56 continues, however, the spring 98 swings the cone 77 upwardly against the limit pin 81. Concurrently, the spring 64 in the after link 57 urges the pin 61 and the binder plate 51 to its second station. Upon the blinder plate's reaching its second station the long lever 56 continues to swing a short additional distance, the spring 64 being partially compressed by this action, but permitting the slight additional movement of the lever 56.

In the meantime, the cone is urged against the limit pin 81 and as the additional swinging movement of the lever 56 takes place, the spring 98 in the forward link 96 is somewhat compressed against the pin 99, but permits the slight additional movement of the lever 56 to occur.

It is this slight additional movement of the lever 56, in a counter-clockwise direction, which swings the leading face 93 of the trip lever 94 across and thereby trips the shutter lever located below the secondary shutter 88. In other words, the cone 77 is urged against the pin 81 with sufficient force so that as the second trip 94 wipes across the shutter lever, whose spring return force is very weak, the shutter is tripped, and the second picture of the watch is taken.

After the two exposures are made, the operator lifts the handle 43 to its initial position, as appears in FIGURES 1 and 2, and the cycle is completed, preparatory for the next run.

Mechanism is provided for advancing the film after the two exposures are taken. Depending from the handle 43 is a sector gear 112 adapted to engage with and rotate a pawl and ratchet structure 113, the pawl being secured to a large uni-directional idler 114, itself in engagement with a pawl 116 so that only clock-wise rotation of the idler can occur. The idler engages with a film spool gear 117. As the handle 43 and the sector gear descend and the two exposures are made, the gear 117 is thereafter rotated in a film advancing direction. Upward movement, or return, of the handle is inoperative to rotate the idler 114 and the gear 117 owing to the latching effect of the pawl 116 on the idler and the slippage of the pawl and ratchet structure 113.

Figure 4:
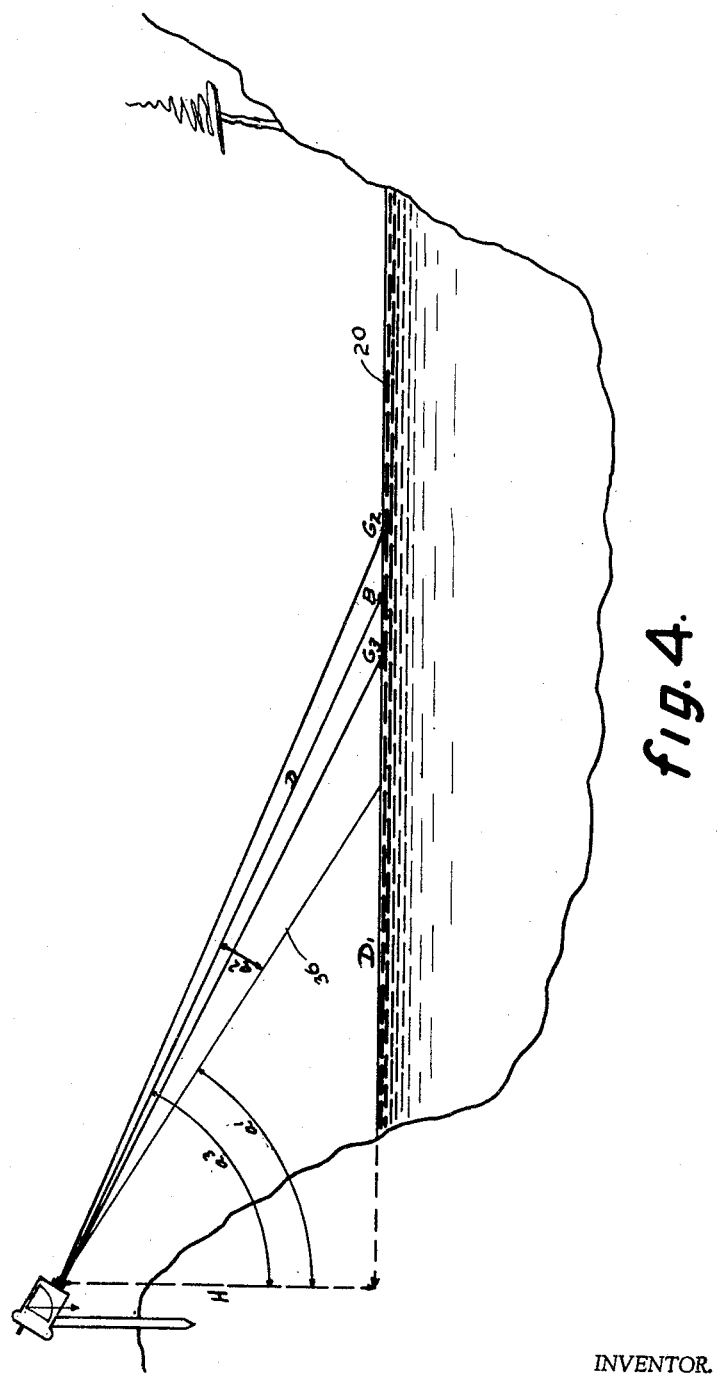
FIGURE 4 is a right side elevational view of the installation and environment shown in FIGURE 3.

Referring to FIGURE 3 it can be seen that the angle of depression of the optical axis can be determined by a protractor 121 mounted on the side of the camera. As previously stated, at the time the camera is installed this angle of inclination of the optical axis is determined and remains fixed. In FIGURE 4 (which also shows the protractor but, for convenience of illustration, on the side opposite that shown in FIGURE 3) it will be noted that from the protractor 121 and a plumb bob 122, angle $a'$ can be determined, $a'$ being the angle between the vertical and the optical axis.

The camera is ordinarily tilted, as previously explained, so that the angle $a'$ is established at an angle which is a multiple of five degrees. The angle of tilt will, of course, vary depending upon the height of the banks and the width of the stream. In the example shown in FIGURE 4, angle $a'$ can be assumed to be 65° and the established height H will be assumed to be 6 meters for the water level illustrated.

Since angle $a'$ is 65°, a grid prepared with dimensions appropriate to the 65° angle is utilized. Since the angle $a'$ remains fixed, once the installation is made, the "65° grid" can remain in place for all subsequent use. The grids are constructed so that the distance between the opposite parallel lines in each square of the grid cut or define or subtend an angular separation of five degrees. This construction of the grid permits the calculation of various other angular values, as will now be expalined.

Angle $a'$ is a known constant and the vertical height H is determined from the recoder 17. After the film is developed, inspection of the sweep on the pictures of the stopwatch provides the value $t$ or time interval while the block moved from B to B'.

Measurements, preferably with a millimeter scale, are thereupon made of various distances on the developed film.

First, the distance, in millimeters, from G to G' is measured, this value GG' being a constant for the particular installation.

Next, the distance, in millimeters, is scaled between B, the block in its first position, and the nearest horizontal grid line.

Then, the distance $G^2G^3$ is scaled, $G^2G^3$ being measured between the two horizontal lines spanning B.

Knowing the value $BG^4$ and the values $G^2G^3$, the angle $a^2$ subtended by the block B above the optical axis line 36 (or below the axis line 36, depending on the location of the block B as it is photographed) can be calculated:

$$a^2 = \frac{BG^4}{G^2G^3} \times 5°$$

plus 5° for each square from which $G^4$ is removed from the axis line 36.

Then, knowing $a^2$, the angle $a^3$ can be determined since:

$$a^3 = a' \pm a^2$$

If the block B is above the optical axis, $a^2$ is added to $a'$; if below, $a^2$ is substracted from $a'$. In either event, the angle $a^3$ represents the angle between the vertical and the line of sight D from the camera to the block B.

Lastly, the angle $b$ (see FIGURE 3) representing the angle subtended by the block in the two locations B and B' is determined by measuring the distance, in millimeters, from B to B' and calculating as follows:

$$b = \frac{BB'}{GG'} \times 5°$$

Knowing H and angle $a^3$, the distance D from the camera to the object is determined by the formula $$D = H \text{ secant } a^3$$

Then, the distance moved by the block in travelling from B to B' is:

$$d = D \text{ tangent } b$$

The velocity, V, is thereupon determined by $$V = \frac{d}{t} \text{ or } \frac{D \tan b}{t} \text{ or } \frac{H \sec a^3 \tan b}{t}$$

where $t$ is the time interval determined from the two exposures of the watch.

The hydrologist must not only know the velocity V, but he must also know where, on the stream this velocity existed. This information is obtained by calculating D', the horizontal distance between the camera and the object as follows:

$$D' = H \tan a^3$$

The values V and D' are determined for a plurality of floating blocks or bits of debris, preferably selected so as to provide the surface velocities at different locations from near one bank of the watercourse to the other.

Having a plurality of such values, the quantity of water flowing past the observation point is readily ascertainable.

The device and the method lend themselves admirably to the determination of the required values and at the same time offer a permanent record of the various factors. Furthermore, by the provisions of suitable illumination, recordings can be made under conditions of inclement weather and poor conditions of visibility.

What is claimed is:

1. A device for measuring the surface velocity of moving water comprising:
   (a) a primary lens system having a fixed optical axis and including a shutter;
   (b) a secondary lens system having an optical axis movable in a horizontal plane between a first and a second angular position said secondary lens system including a shutter;
   (c) a photographic film disposed at right angles to said fixed optical axis;
   (d) an obscuration plate movable from a first position wherein a first half of said film is covered to a second position wherein the other half of said film is covered; and (e) means for tripping the shutters of said primary and said secondary lens systems in cooperation with the movement of said plate from said first position to said second position.

2. The device of claim 1 further characterized by a time piece located in front of said secondary lens system whereby said film records the successive times appearing on said time piece as said shutter tripping means are actuated.

3. The device of claim 1 wherein said shutter tripping means include a first and a second primary lens shutter tripping member and a first and a second secondary lens shutter tripping member, both of said first members being simultaneously actuable and both of said second members being simultaneously actuable.

References Cited by the Examiner
UNITED STATES PATENTS

| | | | |
|---|---|---|---|
| 1,136,105 | 4/15 | Comstock et al. | |
| 1,779,853 | 10/30 | Paulus et al. | |
| 2,006,774 | 7/35 | Ohlsson | 33—17 |
| 2,114,024 | 4/38 | Kondolf | 33—64.5 X |
| 2,209,485 | 7/40 | Tichy | 33—64 |

FOREIGN PATENTS 87,512    7/96   Germany.

ISAAC LISANN, *Primary Examiner.*

ROBERT L. EVANS, *Examiner.*